(12) United States Patent
Schulz et al.

(10) Patent No.: US 8,695,386 B2
(45) Date of Patent: Apr. 15, 2014

(54) MEDICAL LOCKBOX

(75) Inventors: William J. Schulz, Baraboo, WI (US); David Scott Jamison, Twinsburg, OH (US)

(73) Assignee: Flambeau, Inc., Baraboo, WI (US)

( * ) Notice: Subject to any disclaimer, the term of this patent is extended or adjusted under 35 U.S.C. 154(b) by 0 days.

(21) Appl. No.: 13/617,838

(22) Filed: Sep. 14, 2012

(65) Prior Publication Data

US 2014/0076208 A1 Mar. 20, 2014

(51) Int. Cl.
*E05B 65/52* (2006.01)

(52) U.S. Cl.
USPC ........ 70/63; 70/159; 70/161; 70/162; 70/232; 109/50; 109/51; 109/52; 220/210; 248/553

(58) Field of Classification Search
USPC ............... 70/58, 63, 158–173, 232, 451, 466, 70/DIG. 57; 109/50–53, 75; 220/210, 476, 220/480, 481, 475, 628, 630; 224/42.4, 224/543, 557; 248/213.2, 551–553, 686; 232/1 E, 44; 312/327, 328
See application file for complete search history.

(56) References Cited

U.S. PATENT DOCUMENTS

| | | | | | |
|---|---|---|---|---|---|
| 101,770 | A | * | 4/1870 | Schreyer | 109/22 |
| 756,839 | A | * | 4/1904 | Edmonds | 70/168 |
| 963,883 | A | * | 7/1910 | Farley | 109/51 |
| 1,554,958 | A | * | 9/1925 | Falk | 70/260 |
| 1,973,102 | A | * | 9/1934 | Reep | 47/41.01 |
| 2,099,635 | A | * | 11/1937 | Toniolo | 215/377 |
| 2,209,015 | A | * | 7/1940 | Bart | 220/315 |
| 2,535,126 | A | * | 12/1950 | Flowers et al. | 70/169 |
| 2,613,010 | A | * | 10/1952 | Atkinson | 220/475 |
| 2,970,858 | A | * | 2/1961 | Norrenberg-Sudhaus | 292/283 |
| 3,125,873 | A | * | 3/1964 | Robinson | 70/63 |
| 3,213,653 | A | * | 10/1965 | Probasco | 70/166 |
| 3,254,516 | A | * | 6/1966 | Tornoe et al. | 70/38 A |
| 3,415,086 | A | * | 12/1968 | Trainor | 70/240 |
| 3,994,148 | A | * | 11/1976 | Anderson | 70/58 |
| 4,248,067 | A | * | 2/1981 | Sears | 70/58 |
| 4,266,703 | A | * | 5/1981 | Litz | 224/443 |
| 4,325,531 | A | * | 4/1982 | Omholt | 248/553 |
| 4,339,629 | A | * | 7/1982 | Stanmore | 174/50 |
| 4,408,546 | A | * | 10/1983 | Schmidt | 109/75 |
| 4,444,031 | A | * | 4/1984 | Watson | 70/232 |
| 4,577,563 | A | * | 3/1986 | Sidler | 109/52 |
| 4,591,657 | A | * | 5/1986 | Masters | 174/50 |
| 4,603,829 | A | * | 8/1986 | Koike et al. | 248/553 |
| 4,628,827 | A | * | 12/1986 | Litter | 109/50 |
| 4,712,763 | A | * | 12/1987 | Leite | 248/553 |
| 4,884,420 | A | * | 12/1989 | Finkel et al. | 70/58 |
| 5,197,307 | A | * | 3/1993 | Abbott, Jr. | 70/164 |
| 5,235,920 | A | * | 8/1993 | Hector | 109/51 |
| 5,375,440 | A | * | 12/1994 | Patterson | 70/63 |
| 5,503,088 | A | * | 4/1996 | Hayman | 109/50 |

(Continued)

*Primary Examiner* — Lloyd Gall

(74) *Attorney, Agent, or Firm* — Quarles & Brady LLP

(57) ABSTRACT

A lockbox for attaching to a surface including a housing, a lid that is selectively coupled to the housing and includes a lid lock that is arranged to selectively maintain the lid coupled to the housing and to inhibit removal therefrom. An anchoring mechanism is positioned at least partially within the housing and is moveable between an engaged position in which the lockbox is attached to the surface and a disengaged position in which the lockbox is removable from the surface. The anchoring mechanism includes an anchoring mechanism lock which inhibits movement between the engaged position and the disengaged position.

19 Claims, 10 Drawing Sheets

(56) References Cited

U.S. PATENT DOCUMENTS

| | | | |
|---|---|---|---|
| 5,605,316 A * | 2/1997 | Kelley | 248/551 |
| 5,623,841 A * | 4/1997 | Deemar | 70/14 |
| 5,839,303 A * | 11/1998 | Umberg et al. | 70/58 |
| 5,870,910 A * | 2/1999 | Specht | 70/58 |
| 8,272,338 B2 * | 9/2012 | Chow | 109/51 |
| 2008/0041123 A1 * | 2/2008 | McKee | 70/20 |

* cited by examiner

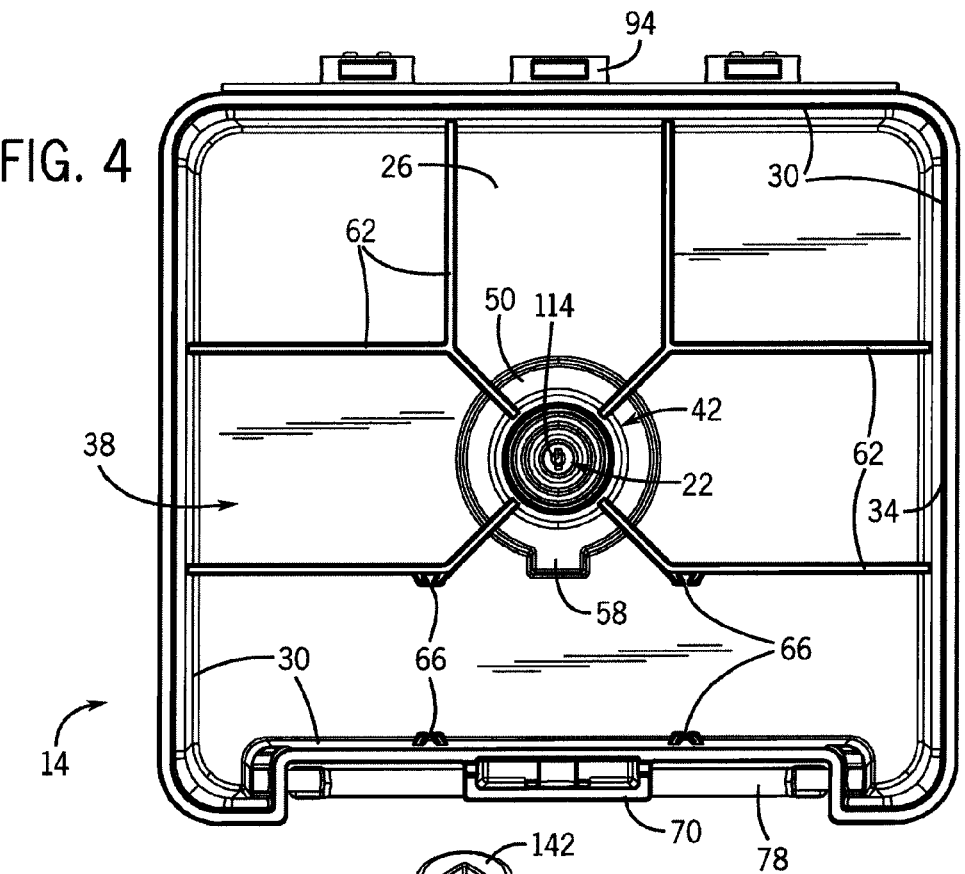

MEDICAL LOCKBOX

BACKGROUND

The invention is directed to lockboxes for securely storing medical supplies and medicine. More particularly, the invention is directed to lockboxes which may be secured to a surface such as a table or wall.

BRIEF SUMMARY OF THE INVENTION

In one embodiment, the invention provides a lockbox for attaching to a surface. The lockbox includes a housing, a lid that is selectively coupled to the housing and includes a lid lock that is arranged to selectively maintain the lid coupled to the housing and to inhibit removal therefrom. An anchoring mechanism is positioned at least partially within the housing and is moveable between an engaged position in which the lockbox is attached to the surface and a disengaged position in which the lockbox is removable from the surface. The anchoring mechanism includes an anchoring mechanism lock which inhibits movement between the engaged position and the disengaged position.

In another embodiment, the invention provides an anchoring mechanism for attaching a work piece to a surface. The anchoring mechanism is associated with the work piece and includes a base mounted to the surface, and an engagement element coupled to the work piece and selectively engageable with the base. The engagement element is moveable between an engaged position in which the engagement element is attached to the base and a disengaged position in which the engagement element is removable from the base. An anchoring mechanism lock is coupled with the engagement element and inhibits movement between the engaged position and the disengaged position.

In another embodiment, the invention provides a lockbox for attaching to a surface. The lockbox includes a housing that defines an interior space and a silo. The silo extends substantially from a bottom surface of the housing to a top surface of the housing. A handle is coupled to the housing and is configured to support the weight of the lockbox. A lid is rotatably coupled to the housing and is movable between a closed position wherein the lid inhibits access to the interior space and an open position wherein the lid allows access to the interior space. The lid defines an aperture substantially aligned with the silo when the lid is in the closed position. A lid lock is actuatable between a lid locked position wherein the lid is inhibited from moving between the open position and the closed position, and a lid unlocked position wherein the lid is free to move between the open position and the closed position. An anchoring mechanism is positioned substantially within the silo and includes an anchoring mechanism lock positioned adjacent a top of the silo, accessible via the aperture in the lid, and actuatable between an engaged position and a disengaged position, and an engagement element that is coupled to the anchoring mechanism lock and is movable with the anchoring mechanism lock between the engaged position and the disengaged position. The engagement element includes a lower flange that defines a first mounting feature and a shaft that connects the flange to the anchoring mechanism lock. A base is mounted to the surface and includes a second mounting feature arranged to be engaged by the first mounting feature. When the anchoring mechanism lock and the engagement element are in the engaged position, the first mounting feature engages the second mounting feature to attach the medical lockbox to the surface. When the anchoring mechanism lock and the engagement element are in the disengaged position, the first mounting feature does not engage the second mounting feature to allow the medical lockbox to be removed from the surface.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 4 is a top view of the lockbox of FIG. 1 with the lid removed.
FIG. 5 is an exploded view of a portion of an anchoring mechanism of the lockbox of FIG. 1.

Figure 1:
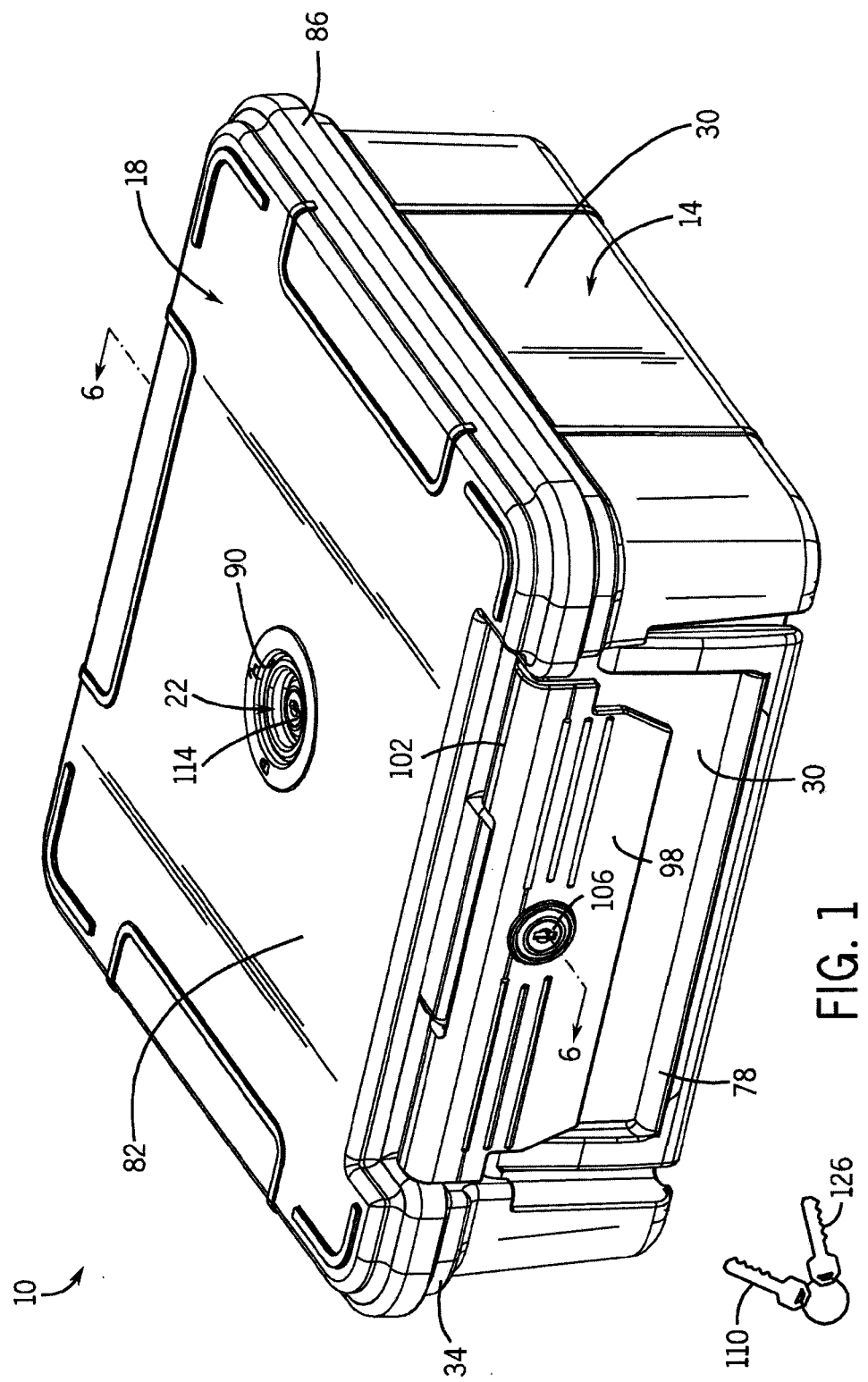
FIG. 1 is a perspective view of a lockbox.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Figure 2:
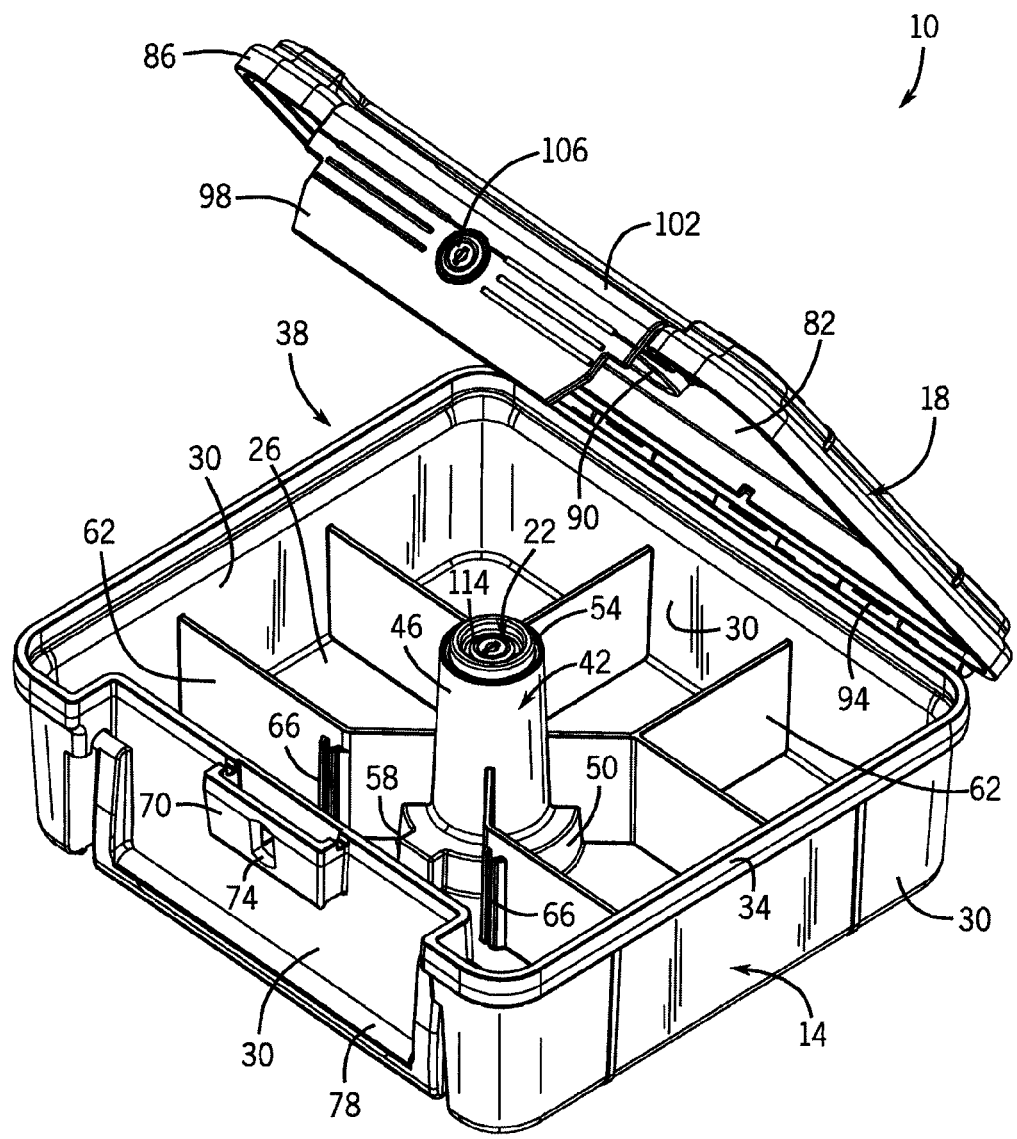
FIG. 2 is a perspective view of the lockbox of FIG. 1 with a lid in an open position.

FIGS. 1 and 2 show a medical lockbox 10 that includes a housing 14, a lid 18, and an anchoring mechanism 22. The housing 14 includes a housing bottom 26, four upstanding side walls 30, and a housing lip 34 atop the side walls 30 that defines an open top of the housing 14. The four side walls 30 and the housing bottom 26 define an interior space 38 of the housing 14.

A silo 42 is defined in the center of the housing 14 extending from the housing bottom 26 to a plane above the side walls 30. The illustrated silo 42 includes an upper portion 46 that is generally cylindrical or frustoconical with a slight taper and an enlarged base portion 50. The upper portion 46 defines a flange 54 near the upper extremity of the silo 42. The enlarged base portion 50 includes a protruding groove 58, but is otherwise generally cylindrical or frustoconical with a slight taper and defines a diameter larger than the diameter of the upper portion 46. The silo 42 is hollow and is open at a top and bottom such that an aperture is formed through the silo 42. In other constructions the silo 42 may be another shape (e.g. cone, square, rectangular, etc.), may not extend the full height of the sidewalls, or may be located in a different position within the interior space 38 (e.g., adjacent a sidewall 30), as desired.

The housing 14 also includes ribs 62 between the sidewalls and the silo 42. The ribs 62 provide rigidity to the structure and separate storage areas for various items. In the illustrated construction, some ribs 62 may be removable. For example, two ribs 62 are removed from the front area of the lockbox 10 and only holding brackets 66 are visible. The housing 14 further includes a latch structure 70 with a latch aperture 74. A handle 78 is pivotably coupled to the housing 14 and is sized such that it can support the weight of the lockbox 10 for carrying. In other constructions, the ribs 62 may be absent or may be shaped differently, as desired.

The lid 18 includes a lid top 82, a lid lip 86 formed around a perimeter of the lid top 82, and a lid aperture 90 formed through the lid top 82. The lid 18 is coupled to the housing 14 with a hinge 94 and is rotable relative to the housing 14 between an open position (see FIG. 2) and a closed position (see FIG. 1).

The lid lip 86 is shaped to engage the housing lip 34 in a secure manner. In the illustrated construction (see FIG. 6), the housing lip 34 includes a projection and the lid lip 86 includes a groove sized to receive the projection. In other constructions, an o-ring or another type of seal can be positioned between the housing lip 34 and the lid lip 86 to provide additional sealing (e.g., against moisture). The lid aperture 90 is positioned such that it aligns with the silo 42 when the lid 18 is in the closed position. The flange 54 formed on the silo 42 engages the lid top 82 of the lid 18 when the lid 18 is in the closed position. Again, an o-ring or other seal may be provided between the flange 54 and the lid top 82 to seal the interface between the silo 42 and the lid 18.

A latch 98 is rotatably coupled to the lid 18 via a hinge 102 and is movable between a latched position (see FIG. 1) and an unlatched position. The latch 98 includes a lid lock 106 that is actuatable between a locked position and an unlocked position. With the lid 18 in the closed position, the latch 98 in the latched position, and the lid lock 106 in the locked position, the latch 98 engages the latch structure 70 on the housing 14 and the lid lock 106 engages the latch aperture 74 to inhibit the latch 98 and lid 18 from moving. In other words, the lid 18 is locked in the closed position. The illustrated lid lock 106 is a keyed lock that is actuated with a lid key 110. In other constructions, another type of lock may be used (e.g., code, keypad, etc.).

Figure 3:
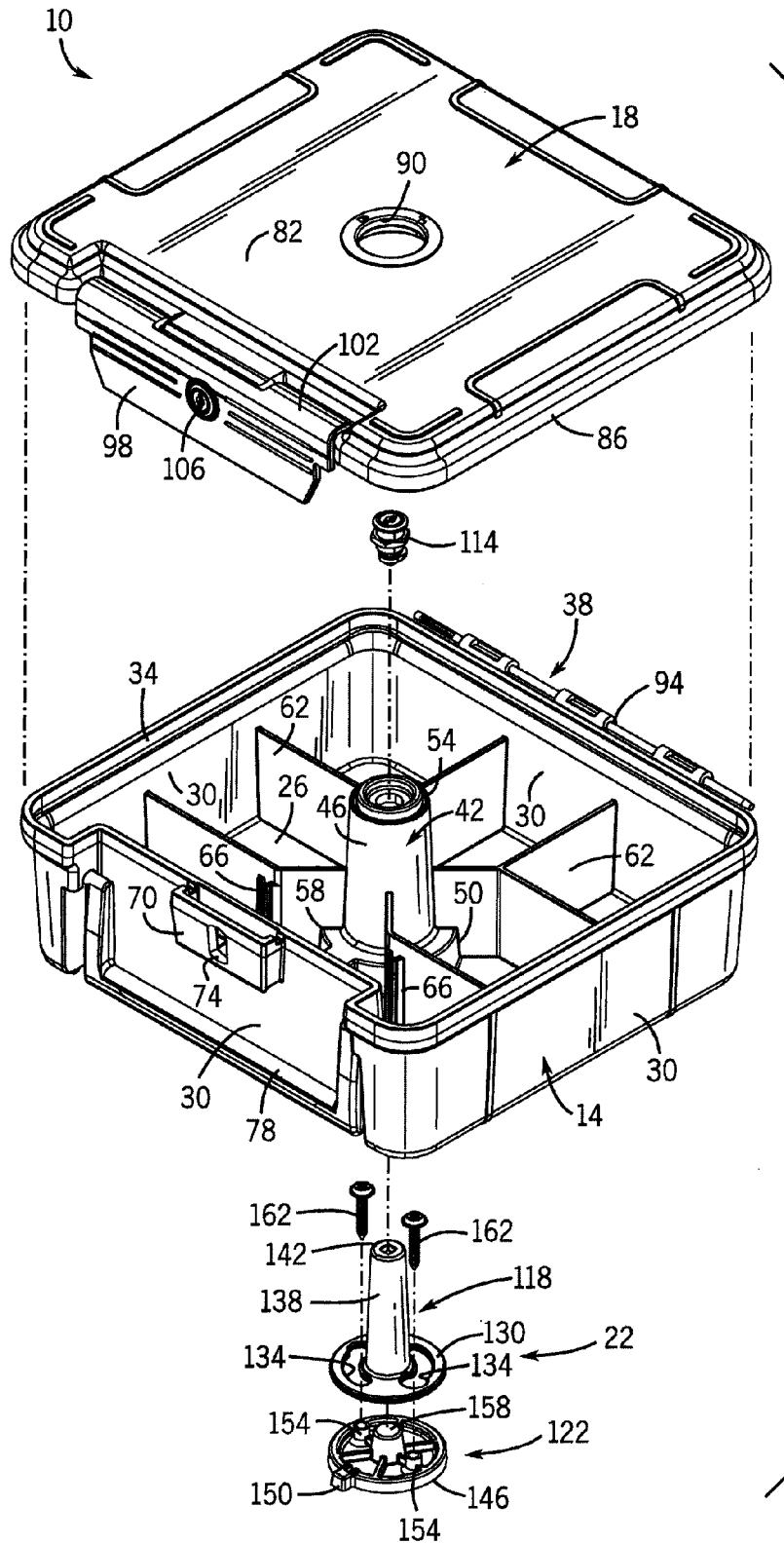
FIG. 3 is an exploded view of the lockbox of FIG. 1.
Figure 6:
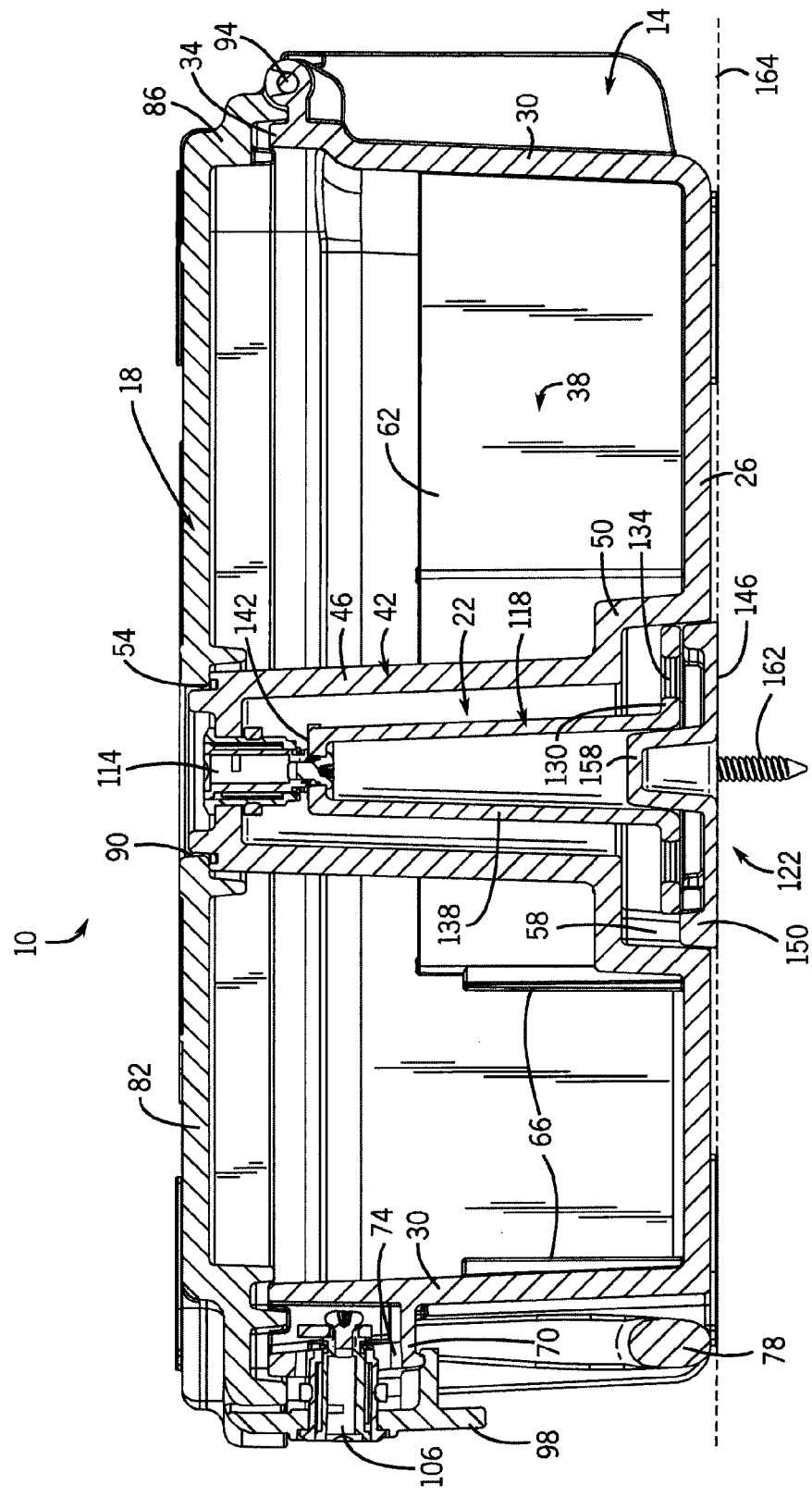
FIG. 6 is a section view of the lockbox of FIG. 1 taken along line 6-6 in FIG. 1.

With reference to FIGS. 3, 5, and 6, the anchoring mechanism 22 is movable between an engaged position and a disengaged position, and includes an anchoring mechanism lock 114, an engagement element 118, and a base 122. The anchoring mechanism lock 114 is mounted in the upper portion 46 of the silo 42 adjacent the upper extremity of the silo 42. The illustrated anchoring mechanism lock 114 is a keyed lock similar to the lid lock 106 but requiring a anchoring key 126 for actuation. The anchoring key 126 is different from the lid key 110. In other constructions, another type of lock may be used (e.g., code, keypad, etc.), and/or the anchoring key 126 could be the same as the lid key 110.

The engagement element 118 is rigidly coupled to the anchoring mechanism lock 114 such that the engagement element 118 rotates with the anchoring mechanism lock 114 when the anchoring mechanism lock 114 is actuated between the engaged position and the disengaged position. Turning to FIG. 5, the engagement element 118 includes a circular flange 130 that defines a first mounting feature in the form of two apertures. Each aperture is a keyhole slot 134 arranged radially about the circular flange 130. A shaft 138 extends from the circular flange 130 to a top portion 142 that is shaped to engage the anchoring mechanism lock 114. The illustrated shaft 138 defines a hollow interior and is generally frusto-conically shaped. In other constructions, the shaft 138 may be solid or shaped differently, as desired.

The base 122 defines a substantially flat bottom surface 146, a side projection 150, two bosses 154, and a top projection 158. Two fasteners 162 in the form of screws pass through the bosses 154 and secure the base 122 to a surface 164. The fasteners 162 and the bosses 154 combine to form a second mounting feature. In other constructions, the second mounting feature may be a separate projection and fasteners or other means may be used to attach the base 122 to the surface 164 (e.g., glue, welding, etc.). The side projection 150 is sized to be received in the protruding groove 58 of the silo 42 to inhibit rotation of the housing 14 when mounted on the base 122. The top projection 158 is sized to be received within the hollow interior of the engagement element 118 to aid in alignment of the housing 14 with the base 122 during installation.

In operation, with the lockbox 10 not attached to the surface 164, the base 122 is positioned as desired on the surface 164 and the fasteners 162 are driven into the surface 164 to secure the base 122 in place and complete the formation of the second mounting feature. Then, with the lid 18 in the closed position, the housing 14 is positioned over the base 122 and the top projection 158 is used to align the housing 14 with the base 122. The housing 14 is then lowered onto the base 122 such that the tops of the fasteners 162 pass into the keyhole slots 134 of the engagement element 118. The user then actuates the anchoring mechanism lock 114 with the anchoring key 126 by accessing the anchoring mechanism lock 114 through the lid aperture 90. The user actuates the anchoring mechanism 22 from the disengaged position to the engaged position. The engagement element 118 turns with the anchoring mechanism lock 114 such that the tops of the fasteners 162 are trapped in the keyhole slots 134 and the housing 14 is secured to the surface 164. When the housing 14 is secured in the engaged position, the anchoring key 126 is removed and the anchoring mechanism 22 is locked in the engaged position.

The lockbox 10 can then be used for storage. The user can use the lid key 110 to actuate the lid lock 106 and open/close the lid 18 to access the interior space 38 of the housing 14. If desired, the user can lock the lid 18 in the closed position, then use the anchoring key 126 to move the anchoring mechanism 22 from the engaged position to the disengaged position and remove the lockbox 10 from the surface 164 without opening the lid 18. Subsequently, the user can replace the lockbox 10 on the base 122 and reattach it to the surface 164 without ever opening the lid 18.

Alternatively, the lid 18 might not include the lid aperture 90 and the silo 42 may not extend above the side walls 30. In such a construction, the anchoring mechanism lock 114 could be positioned within the interior space 38 of the housing 14 such that the lid 18 would be in the open position when the anchoring mechanism 22 was actuated.

In the illustrated construction, the housing bottom 26 is substantially flush with the surface 164 when attached to the surface 164 such that access to the underside of the lockbox 10 is inhibited. This provides a situation wherein the only realistic or intended means for removal from the surface 164 is by use of the anchoring mechanism lock 114.

Figure 7:
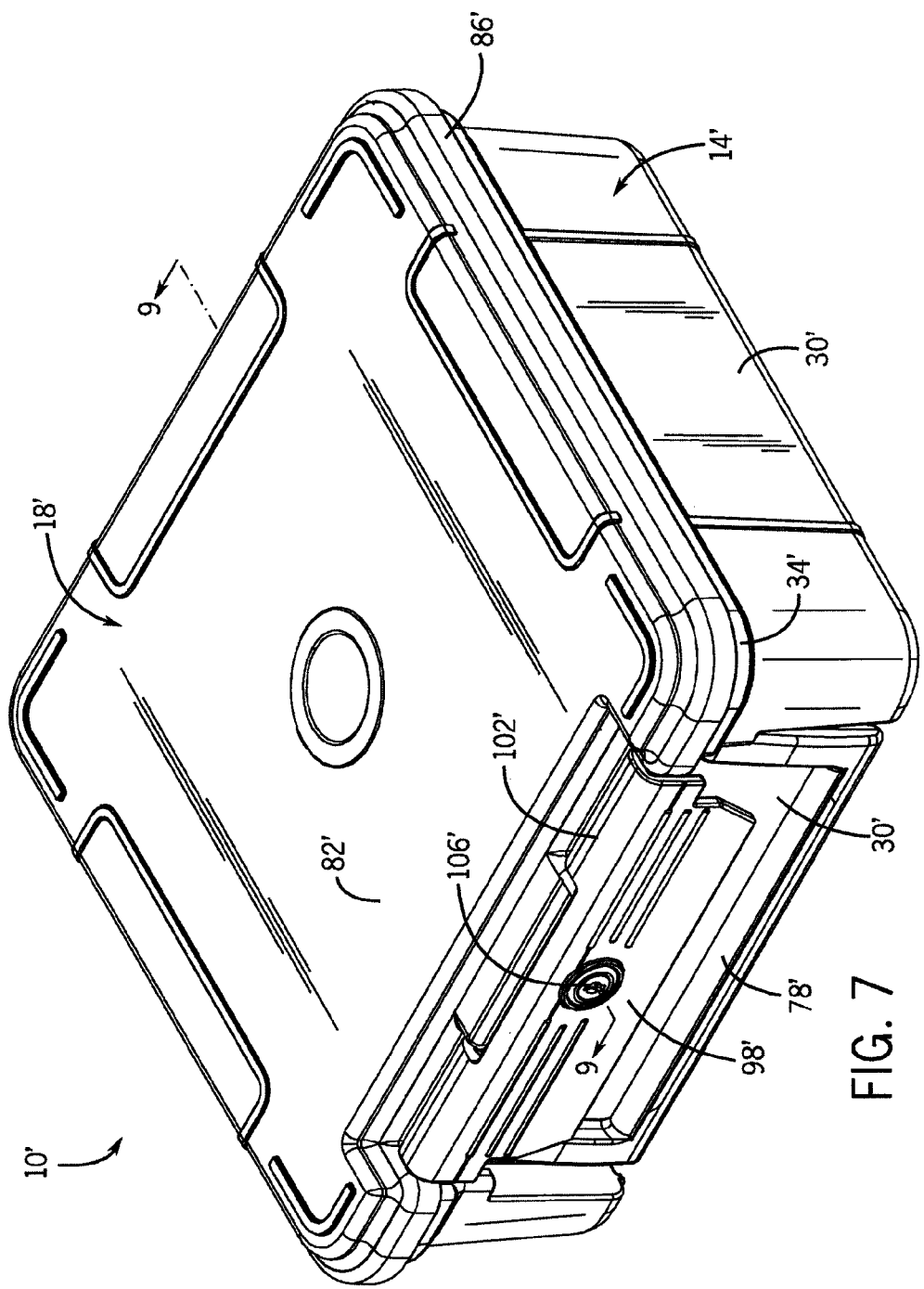
FIG. 7 is a perspective view of another lockbox.

FIGS. 7-11 show alternative lockboxes and are numbered with like numbers to FIGS. 1-6 but with prime numbers. FIG. 7 shows a lockbox 10' similar to the lockbox 10 of FIGS. 1-6 but defining no lid aperture 90 and including any of the anchoring arrangements discussed with respect to FIGS. 8-11.

Figure 8:
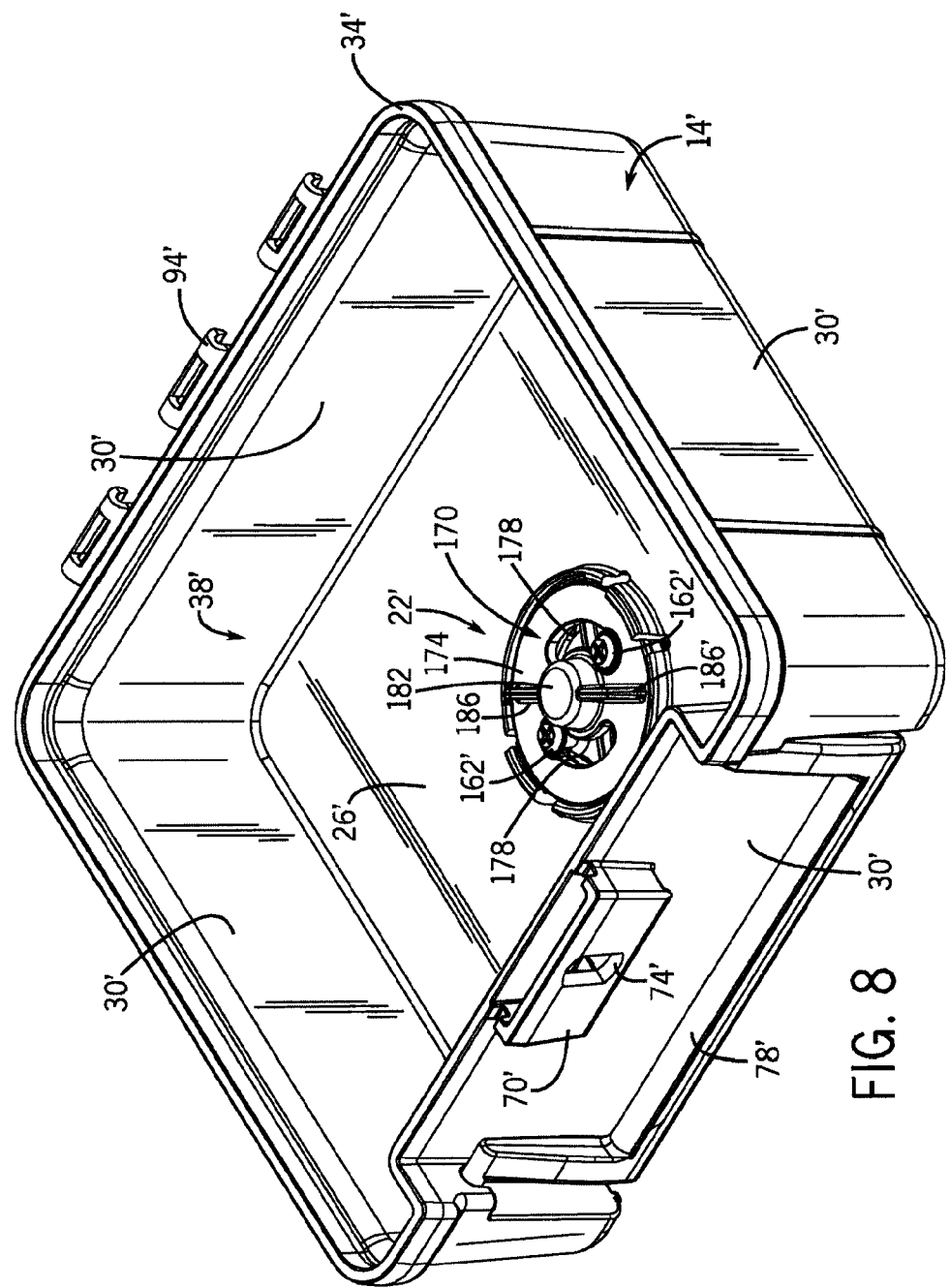
FIG. 8 is a perspective view of the lockbox of FIG. 7 with a lid removed.
Figure 9:
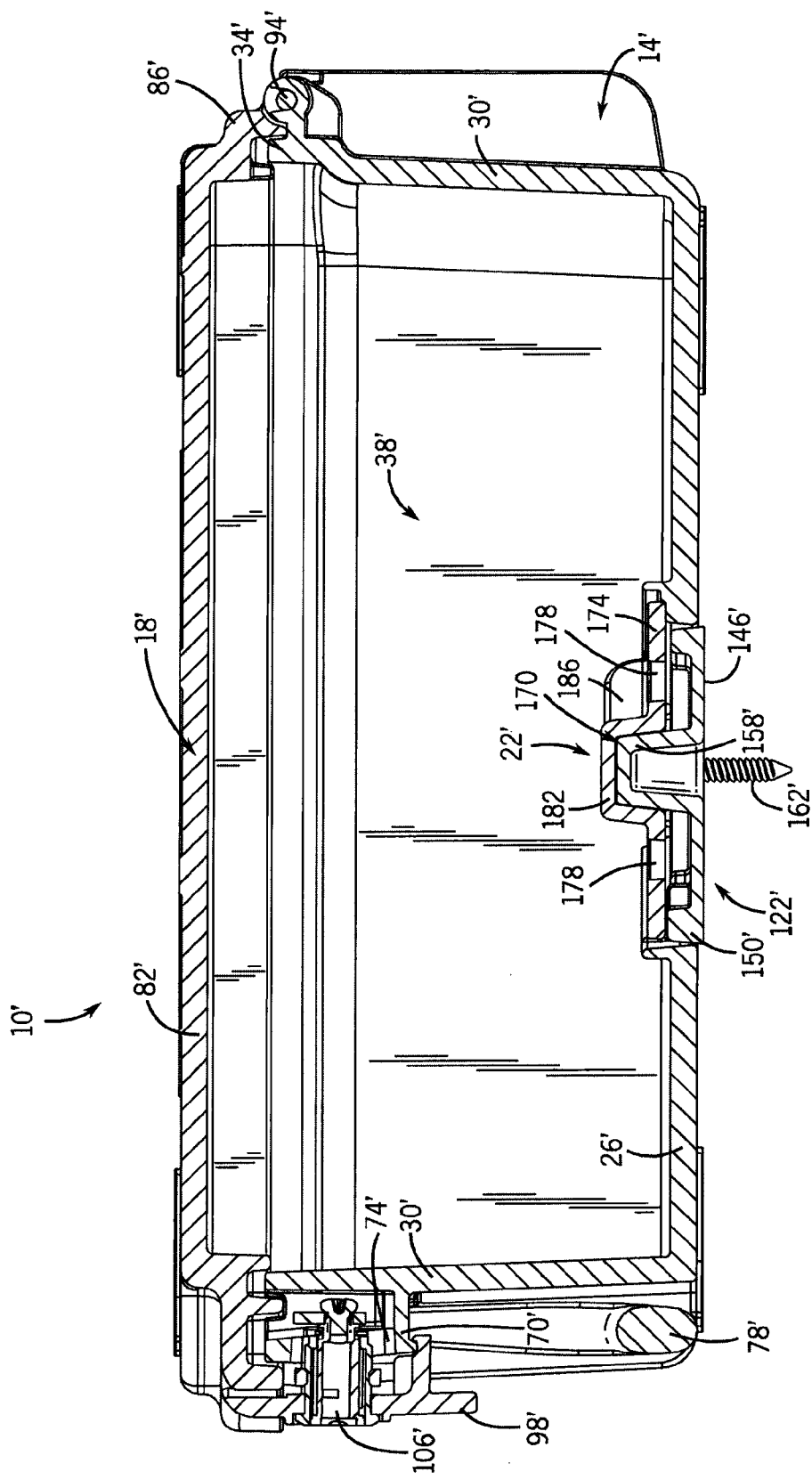
FIG. 9 is a section view of the lockbox of FIG. 7 taken along the line 9-9 in FIG. 7.

FIGS. 8 and 9 show a housing 14' with no silo 42 and no ribs 62. Further, the anchoring mechanism 22' does not include the anchoring mechanism lock 114. Rather, the anchoring mechanism 22' includes a base 122', and a manually operated engagement element 170 that includes a circular flange 174 with keyholes 178, a depression 182 sized to receive the top projection 158' of the base 122', and finger holds 186 that provide a place for the user to grasp the engagement element 170 and actuate it between the engaged position and the disengaged position. In light of the above description with respect to FIGS. 1-6, one of skill in the art will understand the operation of the construction shown in FIGS. 8 and 9.

Figure 10:
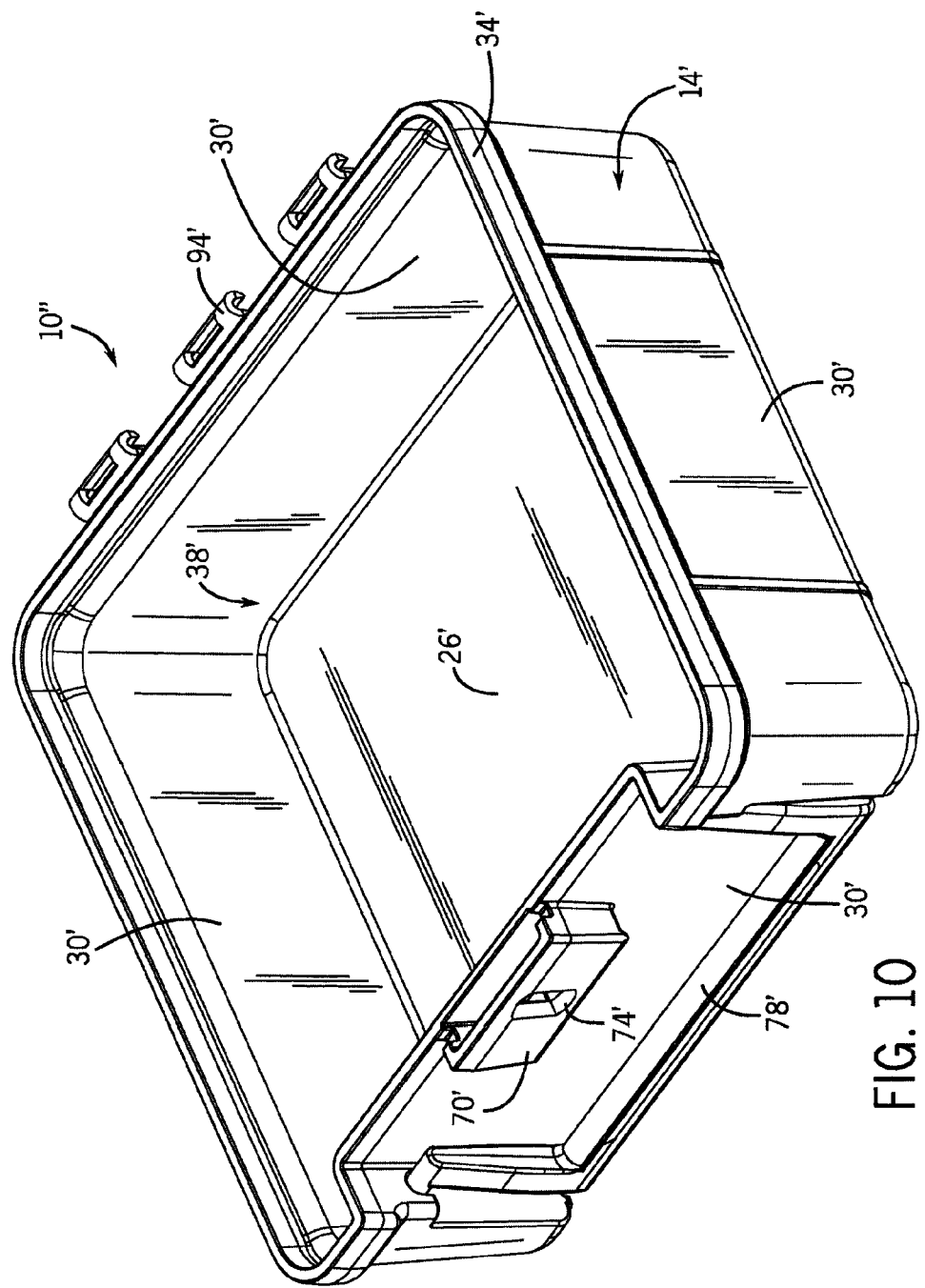
FIG. 10 is a perspective view of yet another lockbox with a lid removed.
Figure 11:
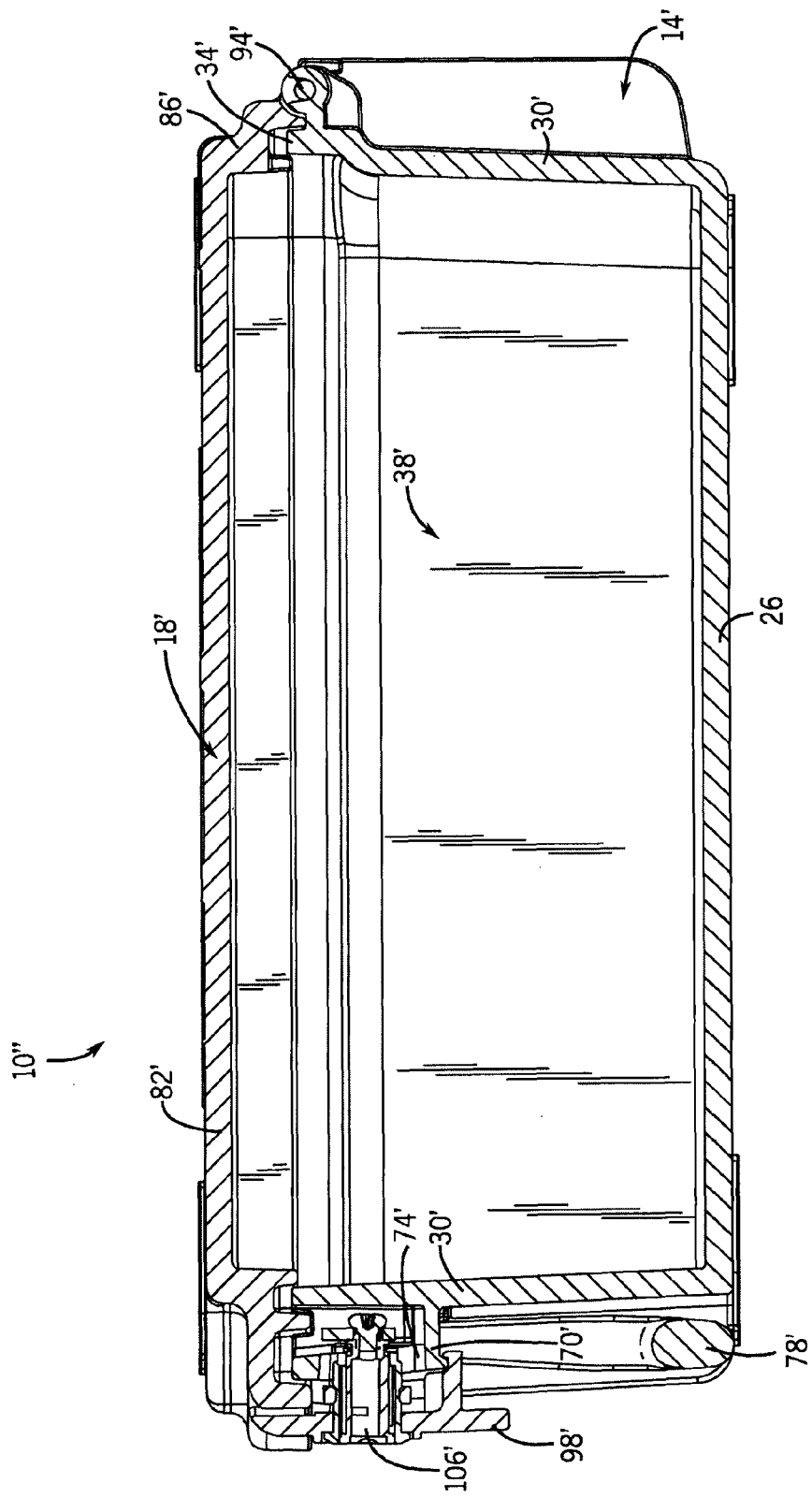
FIG. 11 is a section view of the lockbox of FIG. 10.

FIGS. 10 and 11 show a lockbox 10" that does not include an anchoring mechanism 22 and wherein the housing 14' does not include a silo 42 or ribs 62. This lockbox 10" is not intended to be attached to a surface 164.

Various features and advantages of the invention are set forth in the following claims.

We claim:

1. A lockbox for attaching to a surface, the lockbox comprising:
   a housing defining an interior space;
   a lid moveable between an open position providing access to the interior space and a closed position inhibiting access to the interior space, the lid selectively coupled to the housing and including a lid lock arranged to selectively maintain the lid coupled to the housing and inhibit removal therefrom, the lid defining an aperture; and
   an anchoring mechanism positioned at least partially within the housing and moveable between an engaged position in which the lockbox is configured to be attached to the surface and a disengaged position in which the lockbox is removable from the surface, the anchoring mechanism including an anchoring mechanism lock which inhibits movement between the engaged position and the disengaged position,
   wherein the aperture in the lid provides access to the anchoring mechanism lock while the lid is in the closed position, and
   wherein the lid is moveable between the open position and the closed position while the anchoring mechanism is arranged in the engaged position and the lockbox is attached to the surface.

2. The lockbox of claim 1, wherein the lid lock is configured to be actuated with a key, and
   wherein the anchoring mechanism lock is configured to be actuated with the key.

3. The lockbox of claim 1, wherein the lid lock is configured to be actuated with a lid key, and
   wherein the anchoring mechanism lock is configured to be actuated with an anchoring mechanism key different from the lid key.

4. The lockbox of claim 1, wherein the anchoring mechanism includes a base configured to be mounted to the surface and an engagement element that selectively engages the base,
   wherein the anchoring mechanism is actuated by the anchoring mechanism lock, and
   wherein when the anchoring mechanism is in the engaged position the engagement element engages the base and inhibits removal of the lockbox from the surface, when the anchoring mechanism lock is in the disengaged position the engagement element does not engage the base and the lockbox may be removed from the surface.

5. The lockbox of claim 4, wherein the base includes a projection and the engagement element includes an aperture sized to receive and engage the projection.

6. The lockbox of claim 5, wherein the projection includes a boss and a fastener and the aperture includes a keyhole slot.

7. The lockbox of claim 4, wherein the anchoring mechanism lock is rotatable between the engaged position and the disengaged position, and
   wherein the engagement element rotates with the anchoring mechanism lock.

8. The lockbox of claim 4, wherein the engagement element includes a shaft extending substantially from a bottom of the housing to a top surface of the lid.

9. The lockbox of claim 1, wherein the housing defines a silo, the anchoring mechanism disposed within the silo.

10. The lockbox of claim 9,
    wherein the silo extends at least partially through the aperture.

11. The lockbox of claim 9, wherein the anchoring mechanism lock is positioned adjacent a top of the silo.

12. The lockbox of claim 9, wherein the anchoring mechanism extends along substantially the full length of the silo.

13. The lockbox of claim 9, wherein the silo is generally cylindrical and centrally located in the housing.

14. The lockbox of claim 1,
    wherein the anchoring mechanism lock is accessible while the lid is in the closed position such that the anchoring mechanism may be actuated to the disengaged position and the lockbox removed from the surface without accessing the interior space.

15. The lockbox of claim 1, wherein the housing includes ribs.

16. The lockbox of claim 1, wherein the anchoring mechanism includes a base configured to be mounted to the surface and shaped to engage the housing to inhibit rotation of the base relative to the housing, and
    wherein the anchoring mechanism includes a engagement element that engages the base when the anchoring mechanism is in the engaged position.

17. The lockbox of claim 1, wherein the lockbox is secured to the surface solely by the anchoring mechanism.

18. The lockbox of claim 1, wherein the lid further includes a latch rotatably mounted to the lid and selectively engageable with the housing, the lid lock mounted in the latch.

19. A lockbox for attaching to a surface, the lockbox comprising:
    a housing defining an interior space and a silo, the silo extends substantially from a bottom surface of the housing to a top surface of the housing;
    a handle coupled to the housing and configured to support the weight of the lockbox;
    a lid rotatably coupled to the housing and movable between a closed position wherein the lid inhibits access to the interior space and an open position wherein the lid allows access to the interior space, the lid defines an aperture substantially aligned with the silo when the lid is in the closed position;
    a lid lock actuatable between a lid locked position wherein the lid is inhibited from moving between the open position and the closed position, and a lid unlocked position wherein the lid is free to move between the open position and the closed position; and
    an anchoring mechanism positioned substantially within the silo and including
       an anchoring mechanism lock positioned adjacent a top of the silo, accessible via the aperture in the lid, and actuatable between an engaged position and a disengaged position,
       an engagement element coupled to the anchoring mechanism lock and movable with the anchoring mechanism lock between the engaged position and the disengaged position, the engagement element including a lower flange that defines a first mounting feature and a shaft that connects the flange to the anchoring mechanism lock, and a base configured to be mounted to the surface, the base including a second mounting feature arranged to be engaged by the first mounting feature, wherein when the anchoring mechanism lock and the engagement element are in the engaged position, the first mounting feature engages the second mounting feature to attach the lockbox to the surface, and wherein when the anchoring mechanism lock and the engagement element are in the disengaged position, the first mounting feature does not engage the second mounting feature to allow the lockbox to be removed from the surface.

* * * * *